INVENTOR.
THOMAS L. FAWICK
BY
William J. Flynn
ATTORNEY

INVENTOR.
THOMAS L. FAWICK
BY
William J. Flynn
ATTORNEY

United States Patent Office 3,361,177
Patented Jan. 2, 1968

3,361,177
RESILIENT WHEEL
Thomas L. Fawick, Shaker Heights, Ohio (% Hotel
Statler-Hilton, Cleveland, Ohio 44101)
Filed Apr. 4, 1966, Ser. No. 539,901
2 Claims. (Cl. 152—41)

ABSTRACT OF THE DISCLOSURE

The present resilient wheel has, in addition to the hub and rim, an inner plate member which fits over the hub at its axially outward side, a brake drum which fits over the hub at its axially inward side, and bolts clamping the inner plate member and the drum to the hub. An outer plate member is releasably clamped to the rim at its axially outward end. The inner and outer plate members present axially confronting, annular end faces, and a rubber-like body of appreciable radial and axial thickness is vulcanized to these end faces.

---

Figure 1:
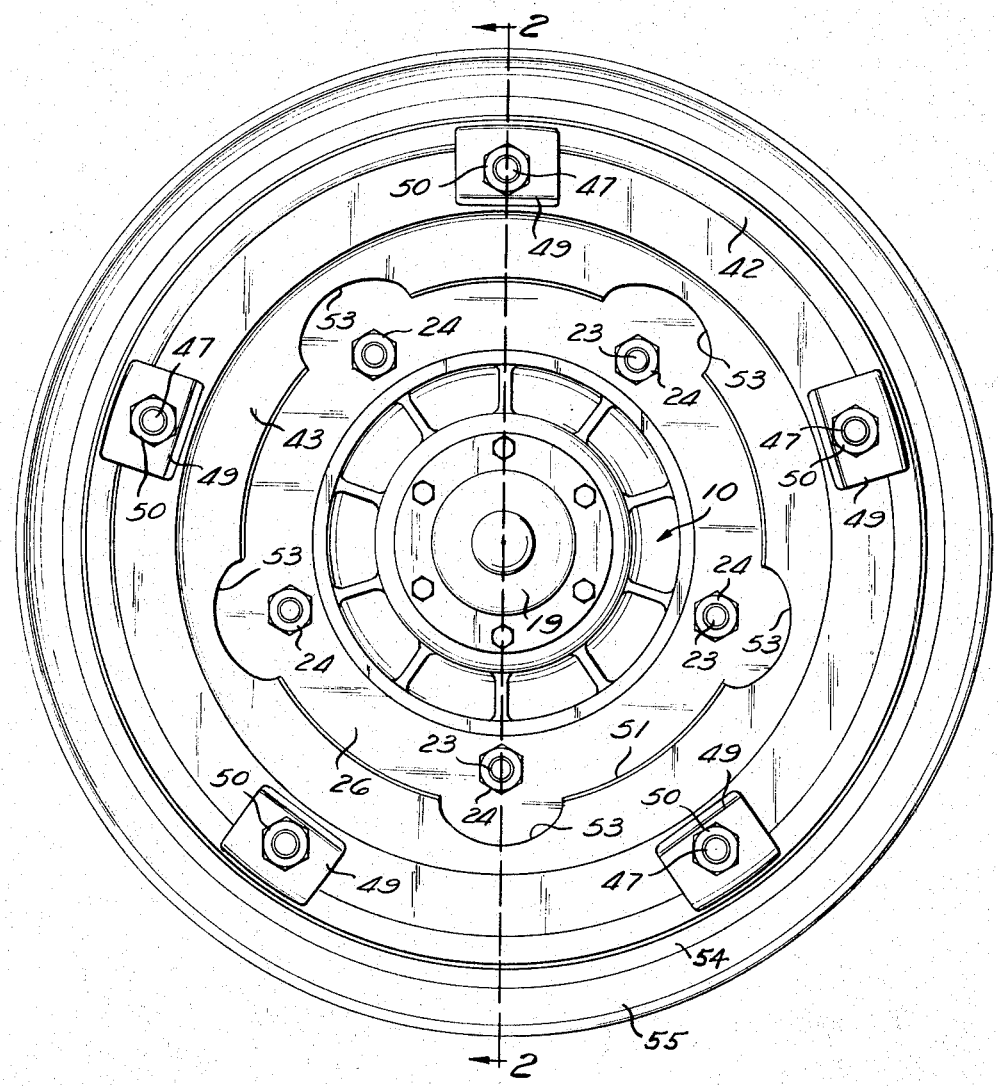

This invention relates to a resilient wheel for automotive vehicles, such as trucks and passenger cars.

So-called "radial ply" tires are coming into widespread use because of their longer tread life, improved retreading characteristics, and the improved fuel mileage which they provide. Radial ply tires have reinforcing cords which extend from bead-to-bead perpendicular to the circumference of the tire and additional reinforcing cords which extend parallel to the beads, in contrast to conventional tires in which the reinforcing cords extend at acute angles to the tire circumference.

Radial ply tires do not deform under load as much as conventional tires, and therefore they may be said to be more rigid than conventional tires. This presents a serious problem because present-day suspensions for passenger cars and trucks are designed for use with conventional tires, relying on the appreciable deformability and resiliency of conventional tires to give certain riding charaterstics and to prevent excessive road shock from being transmitted to the suspension. The use of radial ply tires on conventional rigid wheels of passenger cars or trucks, without changing the suspensions, may produce an unacceptably "hard" ride and it may subject the suspension to excessive road shock. While this difficulty may be overcome by a complete re-design of the suspension, this would be excessively expensive and it does not solve the problem where radial ply tires are to be used as replacement tires on vehicles already equipped with conventional suspensions designed for use with conventional tires.

The present invention is directed to a novel resilient wheel which overcomes these difficulties, enabling the use of radial ply tires on vehicles having conventional suspensions. In accordance with the present invention, the wheel itself provides resilient deformability which, in combination with the conventional suspension, produces the desired riding characteristics. The resilient deformability of the present wheel also protects the suspenson against excessive road shock.

Accordingly, it is the principal object of this invention to provide a novel and improved resilient wheel for vehicles, such as passenger cars or trucks.

Another object of this invention is to provide such a wheel of novel construction which enables the use of radial ply tires on the vehicle without necessitating re-design of the suspension.

Another object of this invention is to provide a novel resilient wheel which retains the hub and rim parts of a conventional wheel and further embodies a novel unitary structure detachably connected separately to the hub and rim parts and providing the desired resilient deformability in the wheel.

Further objects and advantages of this invention will be apparent from the following detailed description of a presently-preferred embodiment thereof, which is illustrated in the accompanying drawings.

Figure 2:
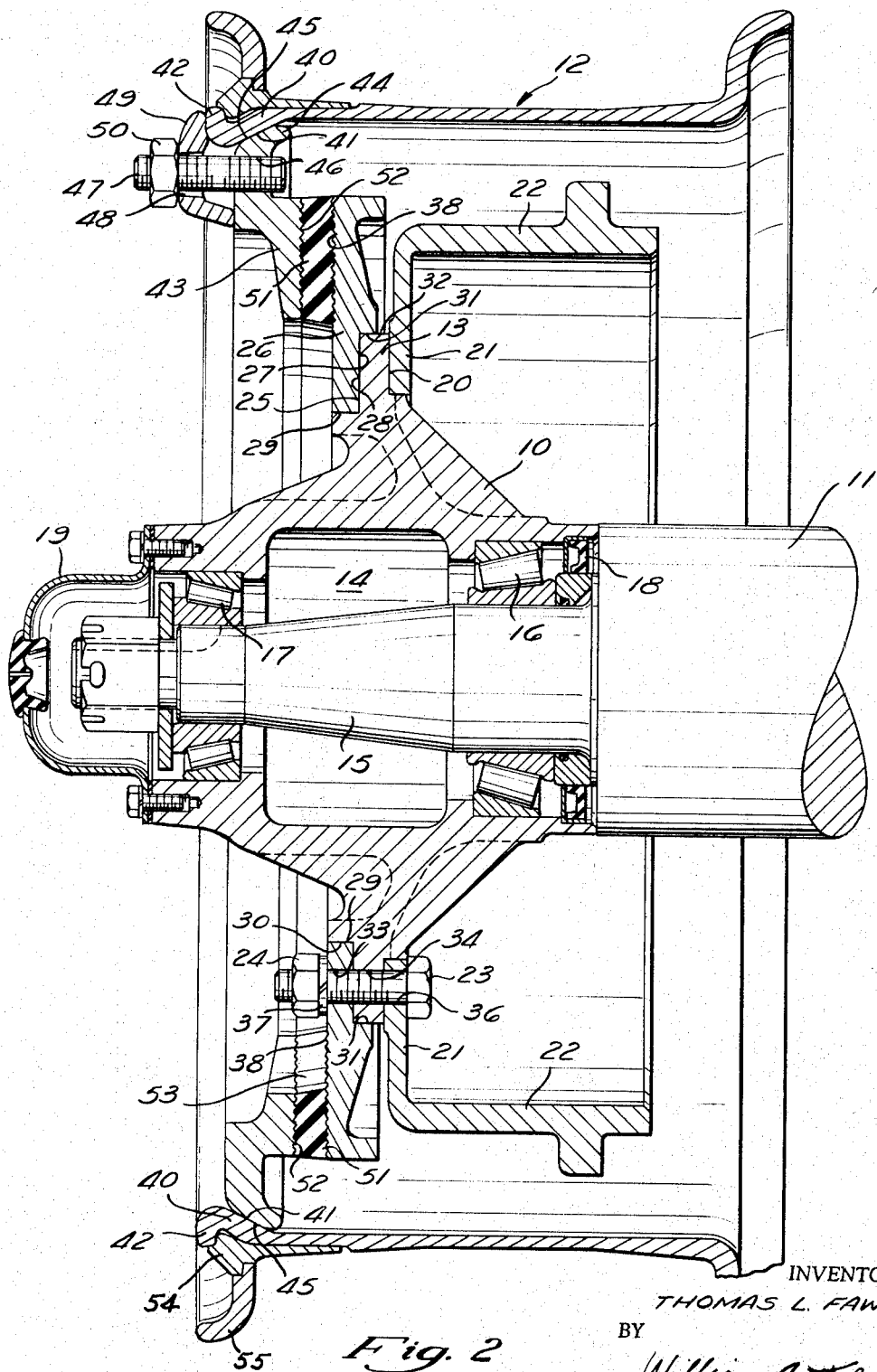

In the drawings:

FIGURE 1 is an end view of a wheel in accordance with the present invention; and FIGURE 2 is an axial section through this wheel, taken along the line 2—2 in FIG. 1.

Referring first to FIG. 2, the wheel illustrated there is a truck wheel including a rigid, annular inner, hub 10 adapted to be mounted on an axle 11 of the truck and a rigid, annular, outer rim 12 for supporting an inflatable radial ply tire (not shown).

The hub is a one-piece body having an annular radial flange 13 at its radially outward extremity and having a central axial opening 14 for receiving the reduced end 15 of the axle 11. Conventional roller bearings 16 and 17 are engaged between the axle and the wheel hub at its axially inboard and outboard ends, respectively. Conventional seals 18 and 19 are provided to protect these bearings in the usual manner.

At the axially inward side of its flange 13 the hub 10 presents an axially inwardly-facing, annular recess 20 which receives the radially disposed end flange 21 of a conventional brake drum 22. The brake drum is attached at this flange 21 to the flange 13 of the hub by a plurality of bolt-and-nut assemblies 23, 24.

The hub 10 as described thus far is identical to a known type of truck wheel hub.

In accordance with the preferred embodiment of the present invention, the hub 10 also presents at the axially outward side of its radial flange 13 an annular, axially outwardly-facing recess 25 which receives and locates an annular, radially disposed, rigid, inner plate member 26. This plate member 26 presents a flat, radially disposed, inner end face 27 abutting against the radially disposed, axially outwardly-facing end face 28 of flange 13, which defines the axially inward end of this recess 25 on the hub 10. Plate member 26 also presents a cylindrical, inside circumferential surface 29 which has a closed sliding fit over a radially outwardly-facing cylindrical surface 30 on the hub 10 at the axially outward side of its flange 13. Plate member 26 also has a cylindrical, radially inwardly-facing surface 31 which has a close sliding fit over the cylindrical outside edge 32 of flange 13. With this arrangement the plate member 26 is seated on the hub 10 with substantially no radial play between them.

The plate member 26 presents a plurality of openings 33 which register with corresponding openings 34 in the hub flange 13 and openings 36 in the brake drum flange 21 for snugly receiving the respective bolts 23. A lock washer 37 is engaged between the inside of each respective nut 24 and an axially outwardly-facing, radially disposed, annular end face 38 of the plate member 26. With this arrangement, the plate member 26 is releasably bolted rigidly to the flange 13 on the hub 10, with substantially no axial or end play between them, by the same bolts which mount the brake drum 22 on the wheel hub.

As shown in FIG. 2, the inner plate member 26 extends radially outward from the hub 10 and terminates radially inward from the inside of the rim 12. Its end face 38 has a serrated, knurled or roughened surface radially outward from the bolts 23.

The rim 12 is identical to a known type of truck wheel rim. It presents near its axially outboard end an integral annular segment 40 which inclines radially inward and axially outward. This segment presents a similarly inclined annular surface 41 at the inside. At this end the rim 12 terminates in a radially outwardly projecting annular lip 42, which is connected integrally to the axially outward end of segment 40. A conventional two-piece tire clamping arrangement 54, 55 is seated on the outside of the rim behind lip 42.

In accordance with the preferred embodiment of this invention, a rigid, annular, outer plate member 43 is releasably connected to the rim and is located axially outward from the inner plate member 26. This outer plate member 43 has a peripheral flange 44 which presents a radially-outwardly and axially-inwardly inclined annular surface 45 for snug engagement with the inclined surface 41 on the inside of the rim. The outer plate member 43 has a plurality of screw-threaded openings 46 which threadedly receive the inner ends of respective bolts 47. Each of these bolts extends axially outward from plate 43 and presents an oppositely threaded outer end which projects freely through an opening 48 in a respective clamping plate 49. A nut 50 is threaded onto the outer end of each bolt 47 axially outward from the respective clamping plate 49. When the nut is tightened, it clamps each plate 49 tightly against the lip 42 of the rim structure 12 and draws the outer plate member 43 up tightly against plate 49 and against the inclined segment 40 on the rim structure 12, with its inclined flange surface 45 abutting against the similarly inclined inside surface 41 on the latter.

The outer plate member 43 has an axially inwardly-facing, radially disposed, annular end face 52 which is in confronting relationship to the axially outwardly-facing end face 38 of the inner plate member 26, spaced axially outward from the latter. This end face 52 has a serrated, knurled or roughened surface.

In accordance with the present invention, a deformable and resilient ring 51 of rubber or rubber-like material is sandwiched between the outer end face 38 of the inner plate member 26 and the confronting inner end face 52 of the outer plate member 43. The rubber-like material 51 is bonded to both of these plate members by vulcanized adhesion around their entire extent circumferentially. The serrated, knurled or roughened configuration of the end faces 38 and 52 on the inner and outer plate members provides increased surface area contact with the rubber-like material 51 to enhance the vulcanized bond between them. This deformable and resilient body 51 has an appreciable axial thickness and it has a radial thickness which is several times its axial thickness, except at cutaway regions 53 (FIG. 1) near the aforementioned nuts 24.

The outer plate member 43 is similarly cut away at these regions 53 to avoid striking the nuts in case the outer wheel structure moves an appreciable distance radially inward under road shock.

Preferably, the rubber-like body 51 is vulcanized to the inner and outer plates 26 and 43 by positioning these plates at the opposite sides of the cavity of a vulcanizing mold and pouring rubber or rubber-like material between them for vulcanization to both. The two plates 26, 43 and the rubber-like body 51 constitute a unitary structure which may be bolted separately to the hub 10 and to the rim 12 in the manner indicated.

The radial and axial thickness of the rubber-like material enables it to deform resiliently under road shock imparted through the tire to the rim 12, so that it substantially absorbs such shock and substantially prevents it from being transmitted to the wheel hub 12.

As shown in FIG. 2, the radially outward edges of the inner plate member 26 and the rubber-like ring 21 have a substantial radial spacing inward from the inside of rim 12. The outside of brake drum 22 has a substantial radial spacing inward from the inside of rim 12, also. Consequently, the rim 12 can be deflected radially inward toward the hub a substantial amount without striking either the brake drum or plate member 26.

While a presently-preferred embodiment of this invention has been described in detail and illustrated in the accompanying drawings, it is to be understood that various modifications which differ from the particular structural embodiment shown may be adopted without departing from the spirit and scope of the present invention.

I claim:

1. In a vehicle wheel having an outer rim for supporting an inflatable tire and an inner hub for receiving a vehicle axle, said hub having a radially outwardly projecting flange, the improvement which comprises: a rigid inner plate member extending around the wheel axis and having a close sliding fit over the periphery of the hub at the axially outward side of said flange and having a close sliding fit over the periphery of said flange, a brake drum at the axially inward side of said flange, a plurality of bolts clamping said inner plate member against the axially outward side of said flange and clamping said brake drum against the axially inward side of said flange, said inner plate member presenting an annular end face which faces axially outward, a rigid outer plate member releasably clamped to said rim at the latter's axially outward end and extending around the wheel axis, said outer end plate member presenting an axially inwardly-facing annular end face which is disposed axially outward from said end face of the inner plate member, and a resilient and deformable annular body of rubber-like material vulcanized to said end faces of the plate members and having an appreciable thickness both radially and axially.

2. A vehicle wheel according to claim 1 wherein said inner plate member terminates radially outward from the hub at a location spaced a substantial distance radially inward from said rim, said rim has an inclined segment inward from its axially outward end presenting an inside surface which is inclined radially inward and axially outward, said outer plate member at its axially outward end has an outer peripheral surface which is inclined substantially the same as said inside surface, and wherein there are provided a plurality of circumferentially spaced clamping plates, each abutting against the axially outward end of said rim and abutting against the axially outward end of said outer plate member radially inward from its abutment against said rim, and bolt means acting between each clamping plate and said outer plate member for bringing said outer plate member and said rim into tight engagement with each other at said inclined surfaces thereof.

References Cited

UNITED STATES PATENTS

| 1,638,646 | 8/1927 | Schoenthal | 301—9 |
| 1,684,596 | 9/1928 | Patch | 152—41 |
| 1,895,579 | 1/1933 | Lussier | 301—11 X |
| 1,976,068 | 10/1934 | Higbee | 301—9 X |
| 2,176,056 | 10/1939 | Brown. | |
| 2,850,065 | 9/1958 | Appel | 152—41 |
| 2,919,737 | 1/1960 | Everitt | 152—47 |

OTHER REFERENCES

Goetze, German printed application 1,118,035, November 1961.

RICHARD J. JOHNSON, *Primary Examiner.*